United States Patent

Shintani

[19]

[11] Patent Number: 5,978,046
[45] Date of Patent: Nov. 2, 1999

[54] TELEVISION RECEIVER WITH PICTURE-IN-PICTURE FUNCTION DISPLAYS TITLES OF REDUCED SCREEN PROGRAMS

[75] Inventor: Peter Shintani, Tokyo, Japan

[73] Assignee: Sony Corporation, Tokyo, Japan

[21] Appl. No.: 08/995,405

[22] Filed: Dec. 19, 1997

[30] Foreign Application Priority Data

Dec. 24, 1996 [JP] Japan .............................. P08-343354

[51] Int. Cl.⁶ .............................. H04N 5/445; H04N 5/45
[52] U.S. Cl. ........................ 348/589; 348/565; 348/566
[58] Field of Search .................................... 348/563, 564,
348/565, 566, 567, 569, 584, 586, 588,
589, 598, 599, 600, 468, 476, 478, 482,
484, 477; H04N 5/45, 5/445, 5/278

[56] References Cited

U.S. PATENT DOCUMENTS

| 5,671,019 | 9/1997 | Isoe | 348/565 |
| 5,734,436 | 3/1998 | Abe | 348/564 |
| 5,790,204 | 8/1998 | Yamaguchi | 348/564 |
| 5,818,541 | 10/1998 | Matsuura | 348/565 |

*Primary Examiner*—Sherrie Hsia
*Attorney, Agent, or Firm*—Jay H. Maioli

[57] ABSTRACT

In a television receiver having a function of picture-in-picture, a character caption on a sub-screen is displayed at an easy-to-see position to enable the content of the sub-screen to be easily understood while looking at the main screen, wherein when either one or multiple sub-screens are displayed in the main screen, the character caption corresponding to the displayed sub-screen is displayed at a proper position to the main screen or on a position displaced from the main screen, it may also be displayed with a character having a shade or displayed with a blanched character or the like, thereby even while watching the main screen, the content of the sub-screen projected may easily be understand through the character caption.

4 Claims, 5 Drawing Sheets

(PIP TYPE SCREEN)

(PIP TYPE SCREEN)

(POP TYPE SCREEN)

TELEVISION RECEIVER WITH PICTURE-IN-PICTURE FUNCTION DISPLAYS TITLES OF REDUCED SCREEN PROGRAMS

BACKGROUND OF THE INVENTION

1. Field of the Invention

This invention relates to a television receiver, and more particularly to PIP (Picture In Picture) type and POP (Picture Out of Picture) type television receivers in which a plurality of images are displayed in one screen.

2. Description of Related Art

In general, it is well known in the art to provide a television receiver having a so-called PIP or POP function in which a plurality of screens are overlapped on a single screen and displayed there. In these television receivers, it is possible to see various kinds of different images in a simultaneous manner. For example, it becomes possible to see a news program while enjoying a movie program.

Such a television receiver as described above having a PIP or POP function is provided with a memory in it, wherein writing-in and reading-out operations for the image signal are alternatively repeated in respect to the memory to produce a reduced image.

In the television receiver having the PIP function, displaying is carried out by overlapping a produced reduced image onto a part of not-reduced image. In addition, normally, sound corresponding to this non-reduced image is outputted through a speaker. In turn, in the television receiver having a POP function, a plurality of image signals are processed to be reduced in size and displayed in matrix on the screen. Additionally, sound corresponding to the image selected from a plurality of reduced images is outputted through the speaker (in the following description, the image from which sound is outputted is called a main screen, and an image through which no sound is outputted is called as a sub-screen.)

However, in the television receiver having PIP function or POP function, there is a problem that a viewer can acknowledge the content of program as regards the main screen where sound is outputted, although the content of program as regards the sub-screen having no sound outputted is hardly understood.

In turn, it is well known in the art to provide a television receiver having a closed caption function for displaying a character caption to assist a physically handicapped viewer.

SUMMARY OF THE INVENTION

In order to solve the aforesaid problems, the present invention provides a television receiver in which image signals from a plurality of image sources are displayed concurrently on a screen characterized in that the same is comprised of a selecting means for selecting an image signal for outputting a corresponding audio signal from image signals attained from a plurality of aforesaid image signals, an audio processing circuit for processing the audio signal corresponding to the selected image signal, and a character caption processing means for processing the character caption associated with the image signal not selected from a plurality of image sources and displaying it together with the plurality of images.

The television receiver is further provided with means for changing colors of outer contours of a plurality of non-selected images when a plurality of non-selected image signals are present and the character caption processing means displays concurrently the color of the character caption with the same colors as those of the contours of the corresponding images.

In the television receiver constituted as described above, the character caption displaying the content of the sub-screen is displayed, thereby even during a period in which the image of the major screen is being enjoyed, the viewer can easily understand the content of the image of the sub-screen.

DETAILED DESCRIPTION OF THE PREFERRED EMBODIMENTS

Figure 1:
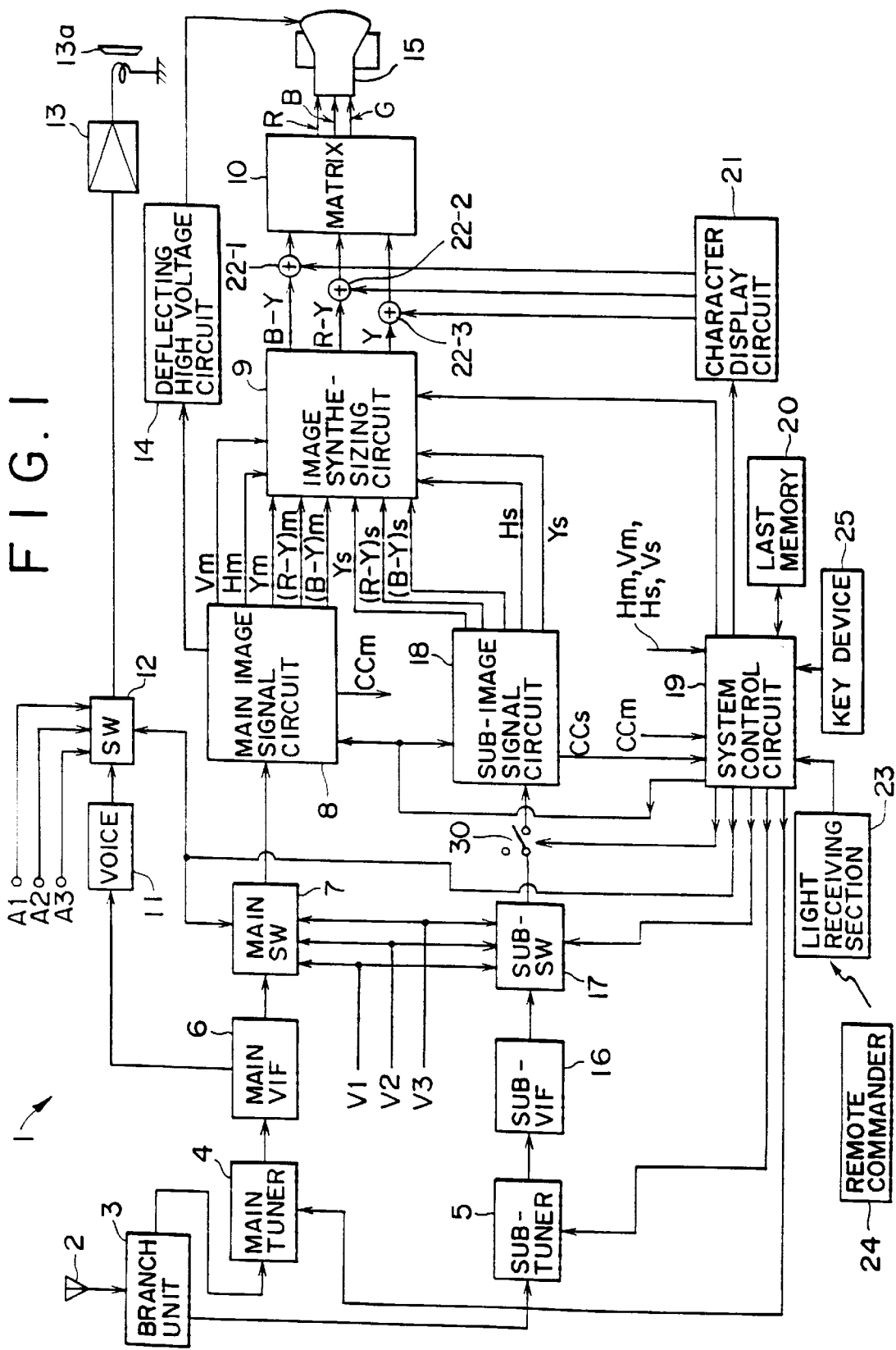
FIG. 1 is a block diagram for showing either PIP type or POP type television receiver of the present invention.

Referring now to the drawings, the television receiver of the present invention will be described.

An antenna 2 is connected to main tuner 4 and a sub-tuner 5 through a branch unit 3. An output of the main tuner 4 is connected to a main image signal circuit 8 through a main image intermediate frequency circuit (a main VIF) 6 and a main switch SW 7. An output of the sub-tuner 5 is connected to a sub-image signal circuit 18 through a sub image intermediate frequency circuit (a sub-VIF) 16, a sub-switch SW 17 and a switch 30. An audio signal outputted from the main image intermediate frequency circuit 6 is supplied to a switch 12 through an audio signal processing circuit 11. An output of the switch 12 is connected to a speaker 13a through an audio amplifier 13. An image signal and an audio signal fed out of external equipment such as a video taperecorder or the like are inputted from external image signal input terminals $V_1$ to $V_3$ and external audio signal input terminals $A_1$ to $A_3$ and the external image signal is supplied to the main switch SW 7 and the external audio signal is supplied to the switch SW 12. Outputs of the main image signal circuit 8 (image signals $Y_m$, $(B-Y)_m$, $(R-Y)_m$, synchronizing signals $V_m$, $H_m$) are connected to a screen synthesizing circuit 9 and a deflecting high voltage circuit 14. Outputs of the sub-image signal processing circuit 18 (image signals $Y_s$, $(B-Y)_s$, $(R-Y)_s$, synchronizing signals $V_s$, $H_m$ are connected to a screen synthesizing circuit 9. Signals Y, B-Y and R-Y outputted from the screen synthesizing circuit 9 are supplied to a matrix circuit 10 through adding circuits 22-1, 22-2 and 22-3. Output signals R, G, B of the matrix circuit 10 are connected to a cathode ray tube 15. Each of the main switch SW 7, sub-switch SW 17 and switches 12, 30 is controlled by a system control circuit 19. To the system control circuit 19 are connected a light receiving section 23 for receiving an infrared ray signal sent from a remote commander 24 and a key device 25 arranged at a front panel of the television receiver. In addition, to the system control circuit 19 is connected a last memory 20 and also a character displaying circuit 21 is connected to the system control circuit 19. An output from the character displaying circuit is connected to adding circuits 22-1, 22-2 and 22-3.

Referring now to FIG. 1, an operation of the television receiver 1 having such a configuration as above will be described in detail.

The received signal received through the antenna 2 is supplied to the branch unit 3, the branch unit 3 supplies the received signal to the main tuner 4 without any attenuation and further supplies it to the sub-tuner 5.

The signal outputted from the main tuner 4 is supplied to the main switch circuit 7 through the main image intermediate frequency circuit (the main VIF) 6 and is changed over with the external image signals attained through the external image signal input terminals V1, V2 and V3. The changed-over image signals are supplied to the main image signal circuit 8. Image quality is adjusted at the main image signal circuit 8, a brightness signal $Y_m$ and color aberration signals $(R-Y)_m$, $(B-Y)_m$ are outputted and supplied to the screen synthesizing circuit 9. At this time, synchronizing signals $H_m$, $V_m$ are also supplied to the screen synthesizing circuit 9.

The audio signal produced from the main image intermediate frequency circuit 6 is supplied to an audio signal processing circuit 11, the audio signal from the audio signal processing circuit 11 is supplied to the switch circuit 12 and is changed over with external audio signals attained from the external audio signal input terminals A1, A2 and A3 corresponding to the aforesaid external image signal input terminals V1, V2 and V3. The audio signals changed over in this way are supplied to the speaker 13a through the audio signal amplifier 13.

Horizontal and vertical synchronizing signals $H_m$, $V_m$ produced from the main image signal circuit 8 are supplied to the deflecting high voltage circuit 14, and the deflecting signal produced at the deflecting high voltage circuit 14 is supplied to the cathode ray tube 15.

A signal outputted from the sub-tuner 5 is supplied to the sub-image intermediate frequency circuit (sub VIF) 16, the image signal from this circuit is supplied to the sub-switch circuit 17 and changed over with the external image signals produced from the external image signal input terminals V1, V2 and V3. The changed-over image signal is controlled in its ON and OFF states and supplied to the sub-image signal circuit 18.

An image adjustment is carried out at the sub-image signal circuit 18, a brightness signal $Y_s$ and color aberration signals $(R-Y)_s$, $(B-Y)_s$ are outputted and supplied to the screen synthesizing circuit 9.

In addition, the main image signal circuit 8 and the sub-image signal circuit 18 retract closed caption signals $CC_m$, $CC_s$ multiplexed on a predetermined line of the vertical feed-line section and output them to the system control circuit 19.

The image synthesizing circuit 9 is composed of an A/D converter, a memory and a D/A converter or the like. The screen synthesizing circuit 9 inputs brightness signals $Y_m$, $(B-Y)_m$, $(R-Y)_m$ of the main image signal and the synchronizing signals $V_n$. $H_m$ of the main image signal from the main image signal circuit 8 and at the same time inputs brightness signals $Y_s$, $(B-Y)_s$, $(R-Y)_s$ of the sub-image signal and the synchronizing signals $V_s$, $H_s$ of the sub-image signal from the sub-image signal circuit 8. The screen synthesizing circuit 9 performs a screen synthesizing processing such as PIP or POP on the basis of the control performed by the system control circuit 19. In the case that PIP or POP processing is not carried out, the system control circuit 18 changes over the switch 30 to the terminal opposite to the state shown in FIG. 1 and at the same time performs a control in such a way that the signal inputted by the main image signal circuit 8 may be outputted to the matrix circuit 10 as it is. Further, in the case that there are present a plurality of images displayed as sub-images, the system control circuit 19 controls the sub-tuner 5 in such a way that a channel is changed for every predetermined time, and the image (a still picture) at each of the channels is stored in the memory in the screen synthesizing circuit 9. With such an arrangement a above, the image displayed as the sub-screen is revised periodically and then an image with reduced number of frames for every image is displayed.

The system control circuit 19 supplies the closed caption (character caption) signal $CC_m$ inputted from the main image signal circuit 8 and the closed caption (character caption) signal $CC_S$ inputted from the sub-image signal circuit 18 to a character displaying circuit 21 and at the same time controls a character displaying circuit 21 in such a way that the character caption signal with changed character caption displaying position, character color and character background color may be generated. The character caption signal generated at the character displaying circuit 21 in this way is supplied to the adding circuits 22-1, 22-2 and 22-3. In addition, the system control circuit 19 can set all the displaying modes of the character displaying circuit 21 for each of (1) displaying only the character caption in the main screen, (2) displaying only the character caption in the sub-screen and (3) displaying character captions in the main screen and the sub-screen. Further, when a plurality of sub-screens to be displayed are present as found in POP, the system control circuit 19 receives the character caption signal for every channel supplied from the sub-image signal circuit 18 and controls the screen synthesizing circuit 9 and the character displaying circuit 21 in such a way that displaying is performed to enable a corresponding relation between the character caption signal and the image to be clearly seen.

In the television receiver comprised of such a configuration as above, it is possible to perform a proper selection that the main screen and the sub-screen are displayed in PIP type or POP type and to perform its display.

Figure 2:
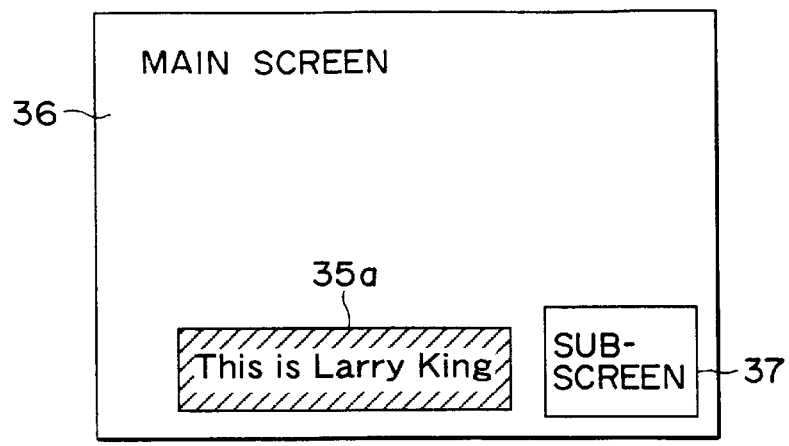
FIG. 2 is an illustrative view for showing a character caption in which the content of a sub-image projected at a sub-screen in the PIP type screen is displayed in a main screen with the content being applied as an opaque background.
Figure 3:
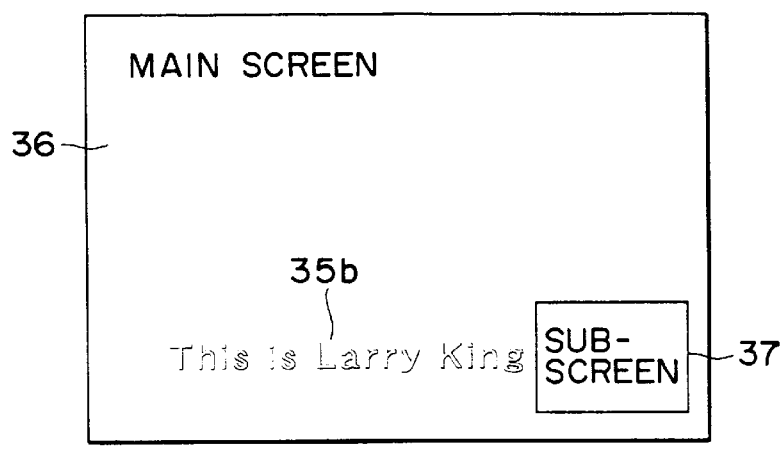
FIG. 3 is an illustrative view for showing a character caption in which the content of a sub-image projected at a sub-screen in the PIP type screen is displayed in a main screen with shaded characters being applied.
Figure 4:
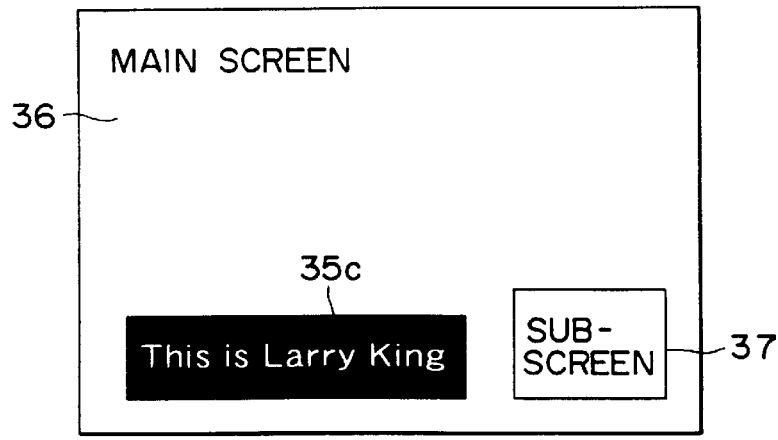
FIG. 4 is an illustrative view for showing a character caption in which the content of a sub-image projected at a sub-screen in the PIP type screen is displayed in a main screen with blanched characters.

FIGS. 2 to 4 illustrate a practical example of a displaying form in which the character caption of one sub-screen is displayed at a proper position in the main screen and FIGS. 5 to 8 illustrate a practical example of a displaying state in which the character captions in a plurality of sub-screens are displayed at the proper positions in the main screen.

As shown in FIG. 2, the example of displaying of the first character caption shows that a sub-screen 37 is displayed at a right lower section of the main screen 36 and a character caption 35a of the sub-screen 37 is displayed on an opaque background at the left side of the sub-screen 37, i.e. the lower side of the main screen 36.

As shown in FIG. 3, the second example of displaying of the character caption is set such that the sub-screen 37 is displayed at the right lower section of the main screen 36 and the character of the character caption 35b of the sub-screen 37 applied with a shaded part is displayed at the lower part of the main screen As shown in FIG. 4, the third example of displaying the character caption is set such that the sub-screen 37 is displayed at the right lower section of the main screen 36 and a character of the character caption 35c in the sub-screen 37 is displayed at the lower part of the main screen 36 while the character is being blanched.

The displays are not limited to the aforesaid first to third examples of display of the character captions 35a, 35b and 35c, but it is satisfactory if the content of the sub-image in the sub-screen 37 during a time in which a viewer sees the main screen 36 can be easily understood by looking at the character captions 35a, 35b and 35c.

Figure 5:
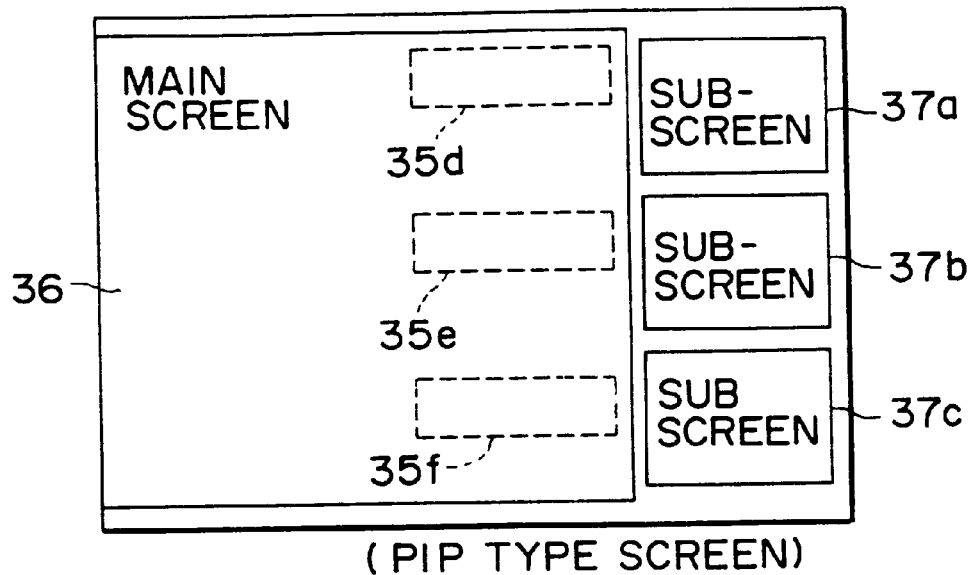
FIG. 5 is an illustrative view for showing a character caption in the PIP type screen while being adapted for the contents of the sub-images projected at a plurality of sub-screens.

As shown in FIG. 5, the fourth example of character caption shows a plurality of sub-screens 37a, 37b and 37c in the main screen 36, and a plurality of subscreens 37a, 37b and 37c (three in the preferred embodiment) are displayed in a vertical orientation at the right side of the main screen 36. Each of the character captions 35d, 35e and 35f corresponding to each of the sub-screens 37a, 37b and 37c is displayed at the left side of each of the sub-screens 37a, 37b and 37c, respectively.

Displaying formats of the character captions 35d, 35e and 35f can be replaced with various kinds of the first to third displaying formats illustrated in the aforesaid FIGS. 2 to 4. Or it may also be applicable that color is applied around the sub-screens 37a, 37b and 37c and the character captions 35d, 35e and 35f are displayed with the same color as that of the former one or similar color. In addition, they may be displayed at the character captions 35d, 35e and 35f in correspondence with the same number as the channel Nos. displayed at the sub-screens 37a, 37b and 37c or the numbers specific to the number of each of the sub-screens 37a, 37b and 37c. In addition, it may also be applicable that the numbers are applied to the physical positions of the sub-screens 37a, 37b and 37c, and they may be displayed in correspondence with the number from above or the number from below, for example, wherein the correspondence of the plurality of sub-screens 37a, 37b and 37c with the character captions 35d, 35e and 35f may easily be understood by looking at the main screen and the sub-screen.

Figure 6:
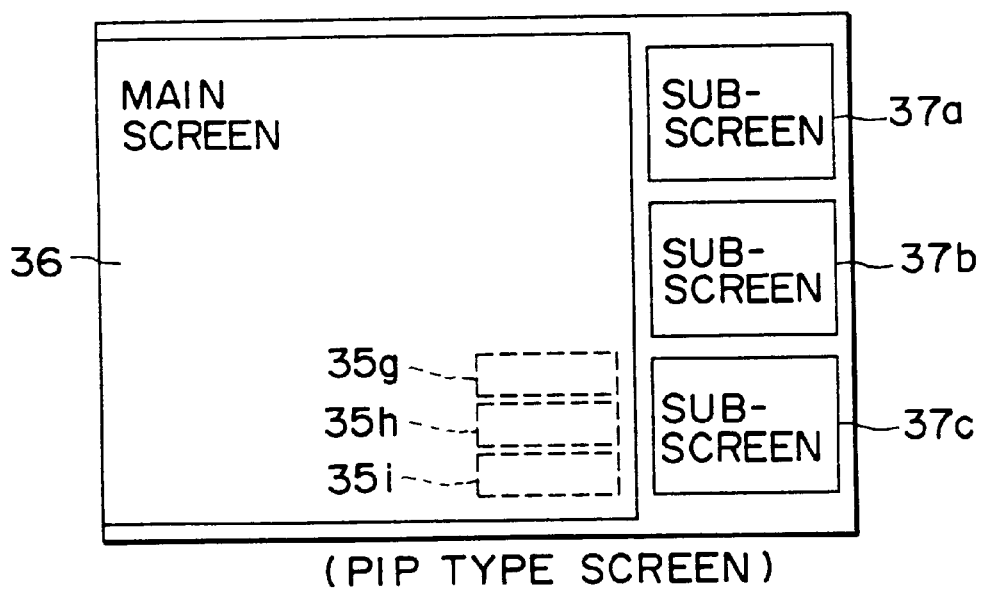
FIG. 6 is an illustrative view for showing a state in which character captions corresponding to the contents of the sub-images projected at a plurality of sub-screens in the PIP type screen are arranged at one location and displayed.

As shown in FIG. 6, the fifth displaying examples 35g, 35h and 35i are displayed such that a plurality of sub-screens 37a, 37b and 37c are displayed in the main screen 36, and a plurality of sub-screens 37a, 37b and 37c (three in the preferred embodiment) are displayed in a vertical orientation at the right side of the main screen 36. The character captions 35g, 35h and 35i in the sub-screens 37a, 37b and 37c are present at the left side of the lower-most sub-screen 37c, displayed in one vertical row at the lower section of the main screen 36, the displaying formats of the character captions 35g, 35h and 35i can take various kinds of first to third displaying formats illustrated in the aforesaid FIGS. 2 to 4 or can be displayed in correspondence with the color and/or number or the like illustrated in the fourth displaying example in FIG. 5.

Figure 7:
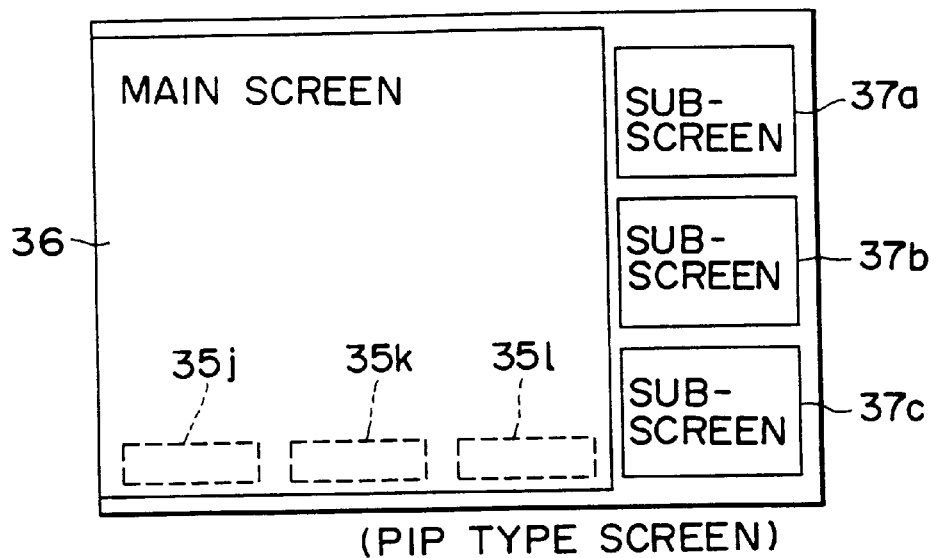
FIG. 7 is an illustrative view for showing a state in which character captions corresponding to the contents of the sub-images projected at a plurality of sub-screens in the PIP type screen are arranged in one row at a lower position of the main screen and displayed.

As shown in FIG. 7, the displaying example of the sixth character caption is set such that a plurality of sub-screens 37a, 37b and 37c are displayed in the main screen 36, wherein a plurality of sub-screens 37a, 37b and 37c (three in the preferred embodiment) are displayed in a vertical orientation at the right side of the main screen 36. The character captions 35j, 35k and 35l in the sub-screens 37a, 37b and 37c are placed at the left side of the lower-most sub-screen 37c, they are arranged in a lateral one row and displayed at the lower section of the main screen 36, the displaying formats of the character captions 35j, 35k and 35l may be displayed at various kinds of first to third displaying formats illustrated in the aforesaid FIGS. 2 to 4 or in correspondence with color and/or number illustrated in the fourth example shown in FIG. 5.

Figure 8:
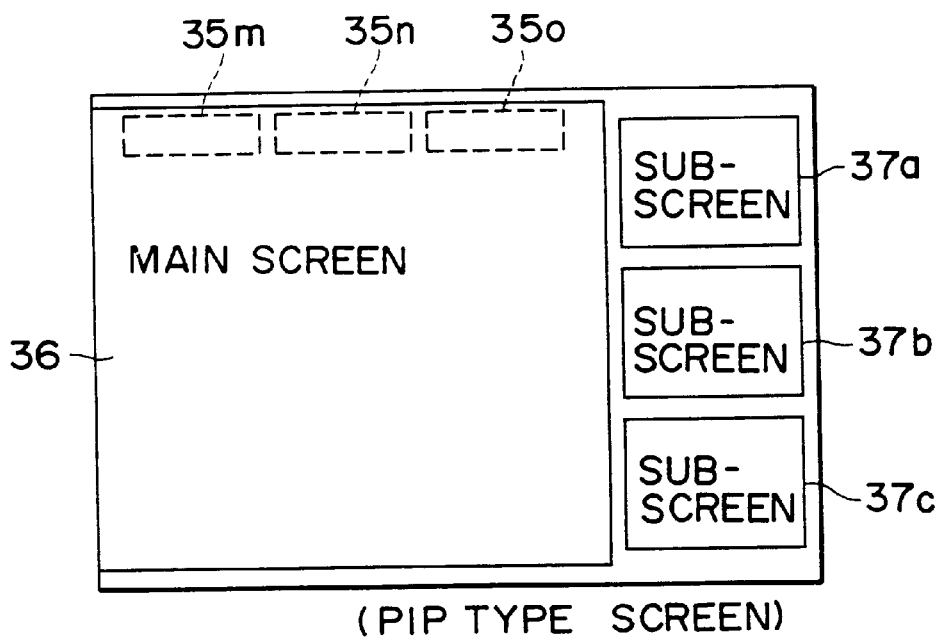
FIG. 8 is an illustrative view for showing a state in which character captions corresponding to the contents of the sub-images projected at a plurality of sub-screens in the PIP type screen are arranged in one row at a upper position of the main screen and displayed.

As shown in FIG. 8, the seventh example of displaying character caption displays a plurality of sub-screens 37a, 37b and 37c in the main screen 36, wherein a plurality of sub-screens 37a, 37b and 37c (three in the preferred embodiment) are displayed in a vertical orientation at the right side of the main screen 36. The character captions 35m, 35n and 35o of the sub-screens 37a, 37b and 37c are present at the left side of the upper-most sub-screen 37a, displayed at the upper part of the main screen 36 in a lateral one row, the displaying formats of the character captions 35m, 35n and 35o can be displayed in various kinds of first to third displaying formats or the color and/or the number illustrated in the fourth displaying example illustrated in FIG. 5.

Figure 9:
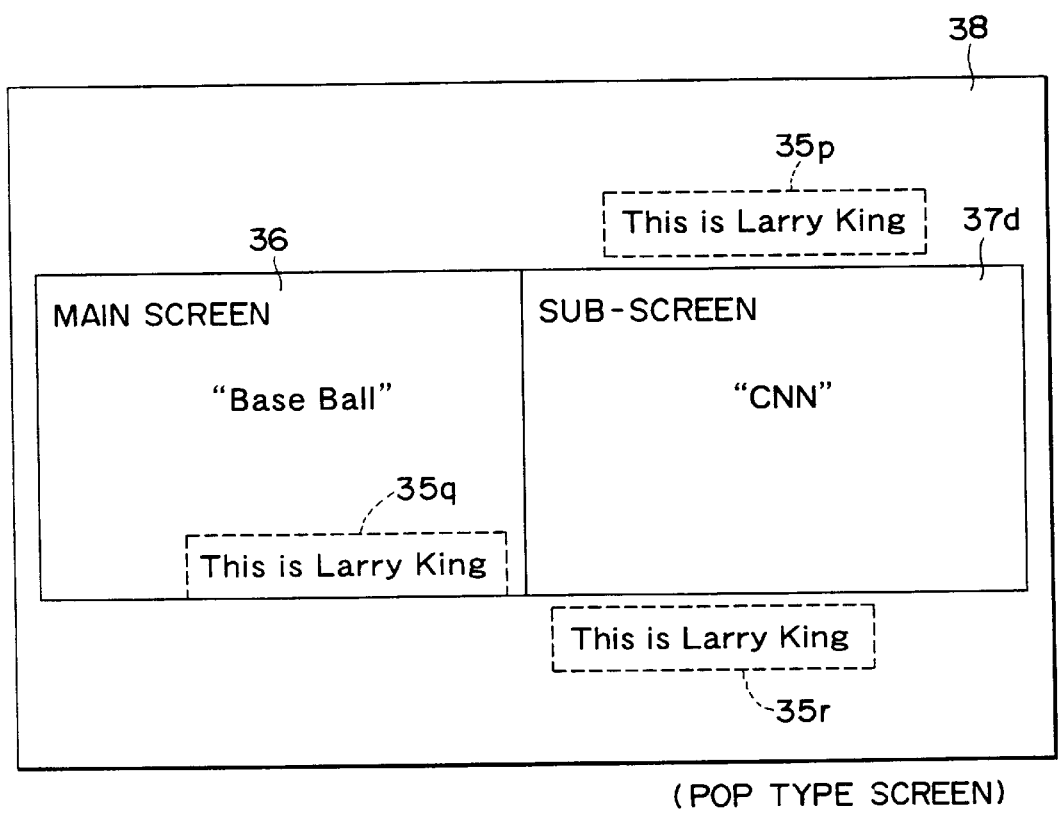
FIG. 9 is an illustrative view for showing a position where the character caption of the content of the sub-screen projected at the sub-screen in the POP type screen is displayed.

FIG. 9 illustrates the divided formats of the main screen and the sub-screen in the POP type screen, wherein the sizes of the displaying screens in the main screen 36 and the sub-screen 37d are made substantially the same to each other and the character captions 35p, or 35q, or 35r in the sub-screen 37d is displayed at a proper position. The character captions 35p, 35q, 35r may be displayed at the position spaced apart from the divided main screen 36 and the sub-screen 37d, i.e. in the blank region 38 or the like or may be displayed at the proper position of the main screen 36 (a position not hindering the main screen) which is seen in a concentric manner.

With such an arrangement as above, if a viewer looks at a baseball game at the main screen 36, for example, the viewer enjoys the image while listening its sound. Concurrently with this operation, the character caption 35p, or 35q, or 35r in the sub-screen 37d is seen sometimes, thereby it may easily be understood what type of content is displayed at the present sub-screen 37d or the like. Accordingly, in the case that the content of the screen can be seen to a certain degree through the character caption and the program at the sub-screen is desired to be seen, the main screen and the sub-screen are changed over through a remote commander or the like, thereby it becomes possible to enjoy the image at the sub-screen together with its sound.

The television receiver of the present invention which has been described above is operated such that the character caption in the sub-screen from which no sound is outputted is displayed, thereby it has an effect that the content of image projected at the sub-screen may easily be seen.

What is claimed is:

1. A television receiver for displaying a plurality of image signals from a plurality of image sources simultaneously on a screen, said television receiver comprising:

selecting means for selecting a first image signal from said plurality of image signals and a corresponding audio signal;

an audio processing circuit for processing said audio signal corresponding to said selected first image signal; and character caption processing means for processing a character caption corresponding to a second image signal and for displaying said character caption simultaneously with said plurality of image signals, wherein said character caption processing means processes a plurality of character caption corresponding to said plurality of image signals with the exception of said first image signal and displays each of said plurality of character captions in a predetermined position of said screen.

2. A television receiver for displaying a plurality of image signals from a plurality of image sources simultaneously on a screen, said television receiver comprising:

selecting means for selecting a first image signal from said plurality of image signals and a corresponding audio signal;

an audio processing circuit for processing said audio signal corresponding to said selected first image signal;

character caption processing means for processing a character caption corresponding to a second image signal and for displaying said character caption simultaneously with said plurality of image signals; and means for changing colors of outer contours of said plurality of image signals with the exception of said first image signal, wherein said character caption processing means displays a color of said character caption with the same color as a corresponding one of said contours.

3. An image signal processing method for processing and displaying a plurality of image signals from a plurality of image sources simultaneously on a screen, comprising the steps of:

selecting a first image signal of said plurality of image signals from said plurality of image sources;

processing and outputting an audio signal corresponding to said selected first image signal;

processing a character caption corresponding to a second image signal of said plurality of image signals from said plurality of image sources;

displaying said processed character caption simultaneously with said plurality of image signals;

processing a plurality of character captions corresponding to said plurality of image signals with the exception of said first image signal; and displaying each of said plurality of character captions in a predetermined position of said screen.

4. An image signal processing method for processing and displaying a plurality of image signals from a plurality of image sources simultaneously on a screen, comprising the steps of:

selecting a first image signal of said plurality of image signals from said plurality of image sources;

processing and outputting an audio signal corresponding to said selected first image signal;

processing a character caption corresponding to a second image signal of said plurality of image signals from said plurality of image sources;

displaying said processed character caption simultaneously with said plurality of image signals;

changing colors of outer contours of said plurality of image signals with the exception of said first image signal; and displaying a color of said character caption with the same color as a corresponding one of said contours.

* * * * *